United States Patent
Silva et al.

(10) Patent No.: US 11,216,565 B1
(45) Date of Patent: Jan. 4, 2022

(54) SYSTEMS AND METHODS FOR SELECTIVELY ENCRYPTING CONTROLLED INFORMATION FOR VIEWING BY AN AUGMENTED REALITY DEVICE

(71) Applicant: Symantec Corporation, Mountain View, CA (US)

(72) Inventors: David Silva, Dublin (IE); Johann Roturier, Maynooth (IE); Pratyush Banerjee, Dublin (IE)

(73) Assignee: NortonLifeLock Inc., Tempe, AZ (US)

( * ) Notice: Subject to any disclaimer, the term of this patent is extended or adjusted under 35 U.S.C. 154(b) by 219 days.

(21) Appl. No.: 16/449,582

(22) Filed: Jun. 24, 2019

(51) Int. Cl.
| | |
|---|---|
| *G06F 21/60* | (2013.01) |
| *H04L 9/30* | (2006.01) |
| *H04L 9/14* | (2006.01) |
| *G06F 21/62* | (2013.01) |
| *H04L 9/08* | (2006.01) |
| *H04L 9/32* | (2006.01) |

(52) U.S. Cl.
CPC ........ *G06F 21/602* (2013.01); *G06F 21/6218* (2013.01); *H04L 9/0866* (2013.01); *H04L 9/14* (2013.01); *H04L 9/30* (2013.01); *H04L 9/3213* (2013.01)

(58) Field of Classification Search
None
See application file for complete search history.

(56) References Cited

U.S. PATENT DOCUMENTS

| | | | |
|---|---|---|---|
| 2015/0200922 A1* | 7/2015 | Eschbach | G06F 40/131 |
| | | | 358/1.14 |
| 2017/0346851 A1* | 11/2017 | Drake | H04L 63/0428 |

OTHER PUBLICATIONS

Greenberg, Andy, "Augmented Reality Glasses Could Visually Encrypt Secrets", URL: https://www.wired.com/2015/08/augmented-reality-glasses-visually-encrypt-secrets/, Wired, Aug. 20, 2015, pp. 1-19.

Forte et al., "EyeDecrypt—Private Interactions in Plain Sight", URL: https://eprint.iacr.org/2013/590, Cryptology ePrint Archive: Report 2013/590, Sep. 11, 2013, 1 page.

Andrabi et al., "Usability of Augmented Reality for Revealing Secret Messages to Users but Not Their Devices", USENIX Association, Symposium on Usable Privacy and Security, Jul. 22, 2015, pp. 89-102.

(Continued)

*Primary Examiner* — Brandon S Hoffman
(74) *Attorney, Agent, or Firm* — FisherBroyles, LLP

(57) ABSTRACT

The disclosed computer-implemented method for selectively encrypting controlled information for viewing by an augmented reality device may include (i) automatically identifying, at a computing device and using at least one of natural language processing and/or a pre-defined data loss prevention policy, a portion of a source text including controlled information, (ii) tokenizing the portion of the source text, and (iii) performing a security action that may include (A) generating a public key, (B) encrypting the tokenized portion of the source text with the public key to produce an encrypted marker, and (C) replacing the portion of the source text with the encrypted marker to produce a replacement document. Various other methods, systems, and computer-readable media are also disclosed.

20 Claims, 8 Drawing Sheets

(56) References Cited

OTHER PUBLICATIONS

Bradbury, Danny, "Tool scrubs hidden tracking data from printed documents", URL: https://nakedsecurity.sophos.com/2018/07/03/tool-scrubs-hidden-tracking-data-from-printed-documents/, Naked Security, Jul. 3, 2018, pp. 1-16.
Boneh et al., "An Efficient Public Key Traitor Tracing Scheme", URL: https://link.springer.com/chapter/10.1007/3-540-48405-1_22, Springer Link, CRYPTO: Advances in Cryptology, Dec. 16, 1999, pp. 1-6.
Keybase, "News Flash: Keybase Exploding Messages", URL: https://keybase.io/blog/keybase-exploding-messages, Jun. 20, 2018, pp. 1-6.
Keybase, "Hierarchical Ephemeral Keys for Exploding Messages", URL: https://keybase.io/docs/chat/ephemeral, Jul. 11, 2005, pp. 1-11.
Wikipedia, "Named-entity recognition", URL: https://en.wikipedia.org/wiki/Named-entity_recognition, retrieved on Jul. 1, 2019, pp. 1-6.
Wikipedia, "Coreference", URL: https://en.wikipedia.org/wiki/Coreference, retrieved on Jul. 1, 2019, pp. 1-4.
Wikipedia, "QR code", URL: https://en.wikipedia.org/wiki/QR_code#Storage, retrieved on Jul. 1, 2019, pp. 1-21.

\* cited by examiner

Input Paragraph
402

The project ALPHA will affect the departments X, Y and Z in Dublin. The project will be undertaken during three distinct phases, the first one starting this quarter. During the second quarter a second project named "Marketing Investing" will be taking place in the US adding 30% in our global costs. Considering that 20% of these costs are being supported by the first project due to organically reducing the engineering workforce by 50% in the European Headquarters, we need to start planning for the remaining 10%.

First Output Paragraph
404

The project [ALPHA MARKER] will affect the [departments X, Y and Z MARKER] in [Dublin MARKER]. The project will be undertaken during three distinct phases, the first one starting this quarter. During the second quarter a second project named "Marketing Investing" will be taking place in the US adding 30% in our global costs. Considering that 20% of these costs are being supported by the first project due to organically reducing the engineering workforce by 50% in the European Headquarters, we need to start planning for the remaining 10%.

Second Output Paragraph
406

[The project ALPHA will affect the departments X, Y and Z in Dublin. The project will be undertaken during three distinct phases, the first one starting this quarter MARKER]. During the second quarter a second project named "Marketing Investing" will be taking place in the US adding 30% in our global costs. [Considering that 20% of these costs are being supported by the first project due to organically reducing the engineering workforce by 50% in the European Headquarters, we need to start planning for the remaining 10%" MARKER].

FIG. 4

SYSTEMS AND METHODS FOR SELECTIVELY ENCRYPTING CONTROLLED INFORMATION FOR VIEWING BY AN AUGMENTED REALITY DEVICE

BACKGROUND

The modern era is one in which control over information is increasingly becoming more complex. In some examples, the information may include sensitive information such as Personally Identifiable Information (PII), classified information, and/or financial information. In some examples, the information may be transmitted via network infrastructure that may be insufficiently trustworthy. In an example, the information may be displayed on paper and/or on screens in environments in which people having different levels of authorization and/or no authorization access the information where physical environments may be insufficiently trustworthy. In an example, hidden cameras and/or eyes of an opportunistic observer may view the information. In other examples, authorized users may make unauthorized copies of the information using screen capture and/or mobile camera technologies.

The present disclosure, therefore, identifies and addresses a need for systems and methods for selectively encrypting controlled information for viewing by an augmented reality device.

SUMMARY

As will be described in greater detail below, the present disclosure describes various systems and methods for selectively encrypting controlled information for viewing by an augmented reality device.

In one example, a method for selectively encrypting controlled information for viewing by an augmented reality device may include (i) automatically identifying, at a computing device and using at least one of natural language processing and a pre-defined data loss prevention policy, a portion of a source text, where the portion includes controlled information, (ii) tokenizing the portion of the source text, and (iii) performing, at the computing device, a security action. The security action may include (A) generating a first public key, (B) encrypting the tokenized portion of the source text with the first public key to produce a first encrypted marker, and (C) replacing the portion of the source text with the first encrypted marker to produce a first replacement document.

In some examples, the portion of source text may be a paragraph. In some embodiments, the portion of source text may include text from which sensitive information may be inferred.

In an example, the method may further include embedding the first public key in the first encrypted marker. In some examples, the first encrypted marker may be an ephemeral marker. In some embodiments, the first encrypted marker may be a two-dimensional barcode.

In an embodiment, the method may further include sending at least one of the first replacement document and/or a private key from the computing device to the augmented reality device via a secure network. In some examples, the private key may be an ephemeral key. In an embodiment, the private key may be signed by the augmented reality device. In some embodiments, the private key may include biometric information.

In some examples, the method may further include (i) receiving, at the computing device, an indication of displaying the portion of the source text on the user display of the augmented reality device, (ii) generating a second public key, (iii) encrypting the portion of the source text with the second public key to produce a second encrypted marker, (iv) replacing the portion of the source text with the second encrypted marker to produce a second replacement document, and (v) sending the second replacement document and/or a second private key (e.g., to access the second replacement document when the second replacement document is visualized elsewhere) to the augmented reality device. In an embodiment, the method may further include embedding the second public key in the second encrypted marker.

In some embodiments, the method may further include (i) receiving, at the computing device, an indication that the controlled information identified by the first encrypted marker is no longer controlled information and (ii) sending the previously controlled information to the augmented reality device with the portion of the source text in place of the first marker.

In one embodiment, a system for selectively encrypting controlled information for viewing by an augmented reality device may include at least one physical processor and physical memory that includes computer-executable instructions that, when executed by the physical processor, cause the physical processor to (i) automatically identify, at the system and using at least one of natural language processing and a pre-defined data loss prevention policy, a portion of a source text, where the portion includes controlled information, (ii) tokenize the portion of the source text, and (iii) perform, at the system, a security action. The security action may include (A) generating a public key, (B) encrypting the tokenized portion of the source text with the public key to produce an encrypted marker, and (C) replacing the portion of the source text with the encrypted marker to produce a replacement document.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) automatically identify, at the computing device and using at least one of natural language processing and a pre-defined data loss prevention policy, a portion of a source text, where the portion includes controlled information, (ii) tokenize the portion of the source text, and (iii) perform, at the computing device, a security action. The security action may include (A) generating a public key, (B) encrypting the tokenized portion of the source text with the public key to produce an encrypted marker, and (C) replacing the portion of the source text with the encrypted marker to produce a replacement document.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the present disclosure.

FIG. 4 depicts a non-limiting example of processing source text.

Figure 1:
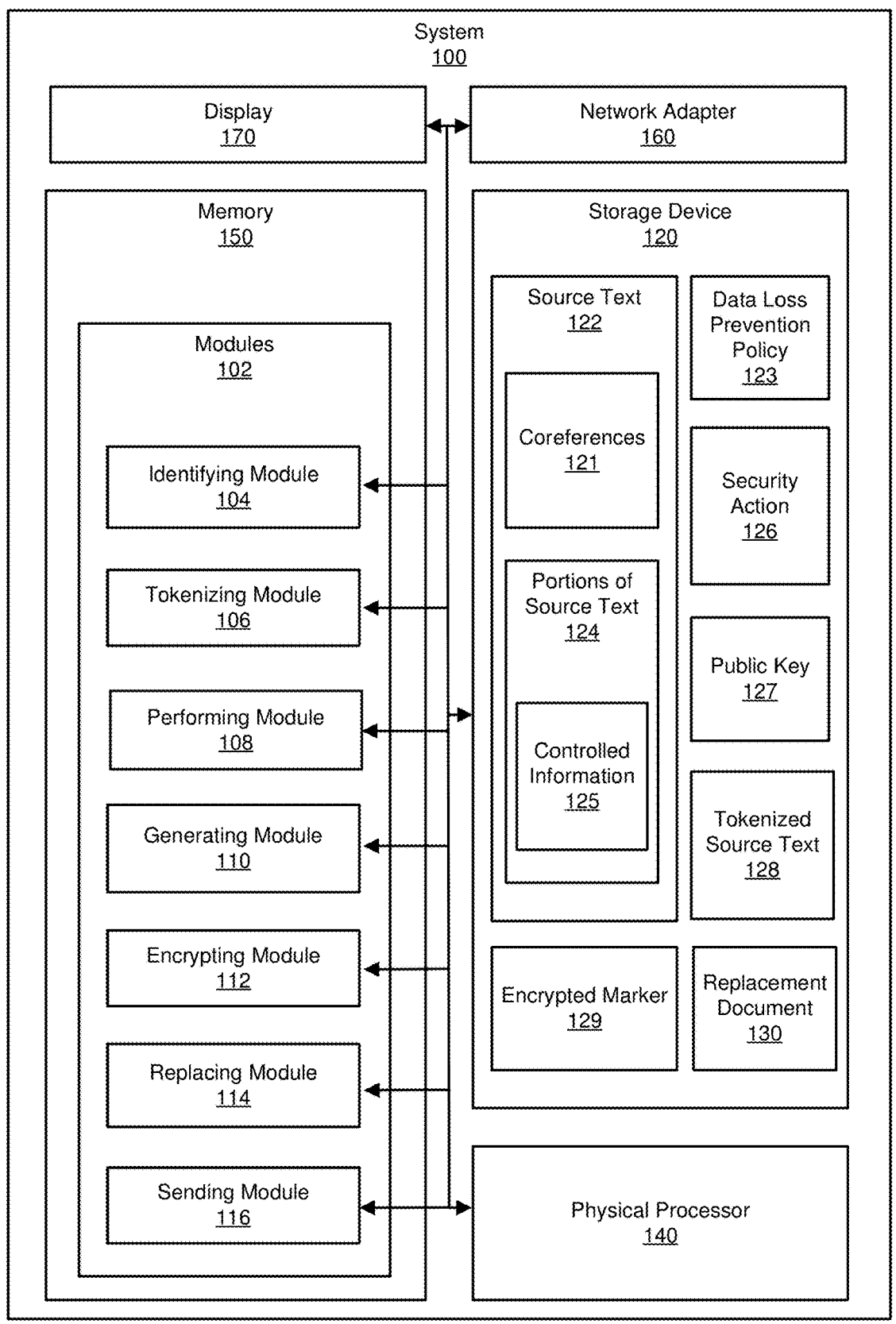
FIG. 1 is a block diagram of an example system for selectively encrypting controlled information for viewing by an augmented reality device.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for selectively encrypting controlled information for viewing by an augmented reality device. In some examples, provided are techniques for authenticating, authorizing use, and/or enabling visualization access using encrypted markers (i.e., machine-readable representations of information) as substitutes for parts of documents including sensitive information. Augmented reality devices may decrypt the encrypted markers using private keys of public-private key pairs and display decrypted text to authorized users. User-specific authentication, such as in forms of bio-authentication, may be used to prevent data loss by authorizing access and/or preventing unauthorized use of the augmented reality devices.

In some examples, provided are systems and methods for determining which portions of source texts are encrypted using encrypted markers. In some embodiments, a predefined data loss prevention policy and natural language processing techniques such as coreference resolution may automatically transform source documents into multiple encrypted markers. The provided techniques may identify keywords and/or explicit instances of sensitive information such as Personally Identifiable Information (PII), classified information, and/or financial information. In some examples, the provided techniques may identify portions of source text from which related sensitive information may be inferred from context in which the sensitive information is presented.

By doing so, the systems and methods described herein may advantageously improve the security of computing devices and/or provide targeted protection against malware, spyware, and/or malicious users. As such, the provided techniques may protect users by beneficially reducing security risks posed by malicious processes and/or malicious users. In some embodiments, the provided techniques may advantageously protect sensitive information from unauthorized disclosures. In examples, the provided techniques may advantageously protect PII from unauthorized disclosures to and/or by untrusted entities. In some examples, the systems and methods described herein may advantageously render ineffective attacks (e.g., interception attacks, man-in-the-middle attacks, over-the-shoulder attacks, attacks by opportunistic observers, hidden camera attacks, mobile camera attacks, unauthorized copying, screen capture attacks, and/or the like) on secure documents including encrypted markers. In some examples, the provided techniques may protect users by beneficially defending against contextual attacks by encrypting portions of source text from which sensitive information may be inferred from related context.

Figure 2:
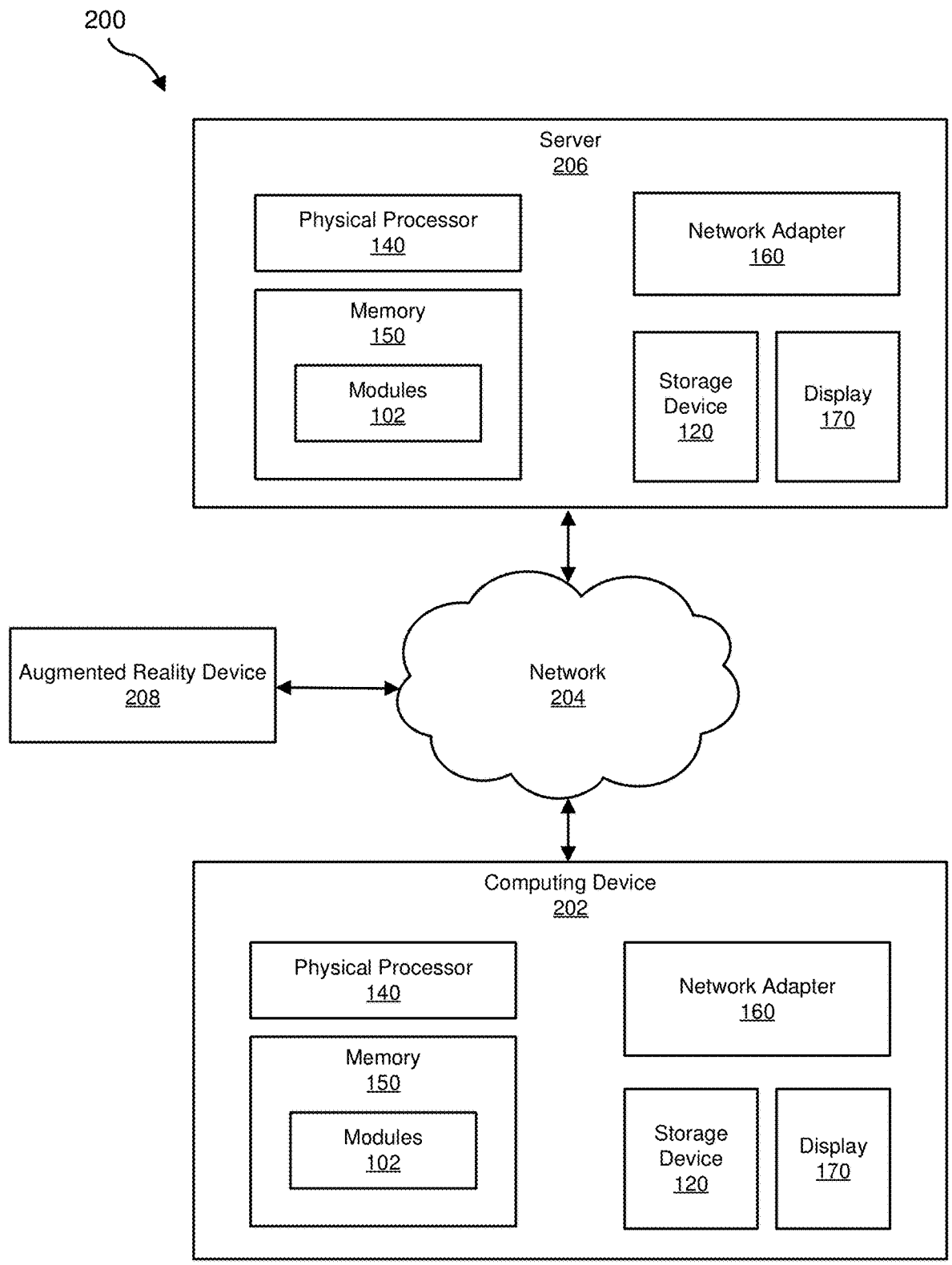
FIG. 2 is a block diagram of an additional example system for selectively encrypting controlled information for viewing by an augmented reality device.

The following will provide, with reference to FIGS. 1-2, detailed descriptions of example systems for selectively encrypting controlled information for viewing by an augmented reality device. Detailed descriptions of corresponding computer-implemented methods will also be provided in connection with FIG. 3-5. In addition, detailed descriptions of an example computing system and network architecture capable of implementing one or more of the embodiments described herein will be provided in connection with FIGS. 7 and 8, respectively.

FIG. 1 is a block diagram of an example system 100 for selectively encrypting controlled information for viewing by an augmented reality device. As illustrated in this figure, example system 100 may include one or more modules 102 for performing one or more tasks. As will be explained in greater detail below, modules 102 may include an identifying module 104, a tokenizing module 106, a performing module 108, a generating module 110, an encrypting module 112, a replacing module 114, and/or a sending module 116. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, server 206, and/or augmented reality device 208). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of co-references 121, source text 122, data loss prevention (DLP) policy 123, portions of source text 124, confidential information 125, security action 126, public key 127, tokenized source text 128, encrypted marker 129, and/or replacement document 130. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

As illustrated in FIG. 1, example system 100 may also include one or more physical processors, such as physical processor 140. Physical processor 140 generally represents any type or form of hardware-implemented processing unit capable of interpreting and/or executing computer-readable instructions. In one example, physical processor 140 may access and/or modify one or more of modules 102 stored in memory 150. Additionally or alternatively, physical processor 140 may execute one or more of modules 102 to facilitate selectively encrypting controlled information for viewing by an augmented reality device. Examples of physical processor 140 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more memory devices, such as memory 150. Memory 150 generally represents any type or form of volatile or non-volatile storage device or medium capable of storing data and/or computer-readable instructions. In one example, memory 150 may store, load, and/or maintain one or more of modules 102. Examples of memory 150 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more network adapters, such as network adapter 160. In some examples, network adapter 160 may be a physical network adapter connected to a physical network (e.g., network 204 in FIG. 2).

As illustrated in FIG. 1, example system 100 may also include one or more display devices, such as display 170. Display 170 generally represents any type or form of device capable of visually displaying information (e.g., to a user). In some examples, display 170 may present a graphical user interface. In non-limiting examples, display 170 may present at least a portion of information indicating one or more of co-references 121, source text 122, data loss prevention (DLP) policy 123, portions of source text 124, confidential information 125, security action 126, public key 127, tokenized source text 128, encrypted marker 129, and/or replacement document 130.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to encrypt controlled information for viewing by an augmented reality device. For example, and as will be described in greater detail herein, one or more of modules 102 may cause computing device 202 and/or server 206 to (i) automatically identify, using at least one of natural language processing and pre-defined data loss prevention policy, a portion of source text 124, where the portion includes controlled information 125, (ii) tokenize the portion of source text 124, and (iii) perform, at system 100, security action 126. Security action 126 may include (A) generating public key 127, (B) encrypting tokenized portion of source text 128 with public key 127 to produce encrypted marker 129, and (C) replacing the portion of source text 124 with encrypted marker 129 to produce replacement document 130.

Computing device 202 generally represents any type or form of computing device capable of reading computer-executable instructions. In some examples, computing device 202 may represent a computer running security software, such as privacy software and/or data loss prevention software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202, server 206, and/or augmented reality device 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that is capable of reading computer-executable instructions. In some examples, server 206 may represent a computer running security software, such as privacy software and/or data loss prevention software. Additional examples of server 206 include, without limitation, security servers, application servers, web servers, cloud data protection gateways, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Augmented reality device 208 generally represents any type or form of computing device that is capable of reading computer-executable instructions and displaying images to users. In some examples, augmented reality device 208 may represent a computer running security software, such as privacy software and/or data loss prevention software. Additional examples of augmented reality device 208 include, without limitation, head-mounted displays, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device. Although illustrated as a single entity in FIG. 2, augmented reality device 208 may include and/or represent a plurality of computing devices that work and/or operate in conjunction with one another.

Figure 3:
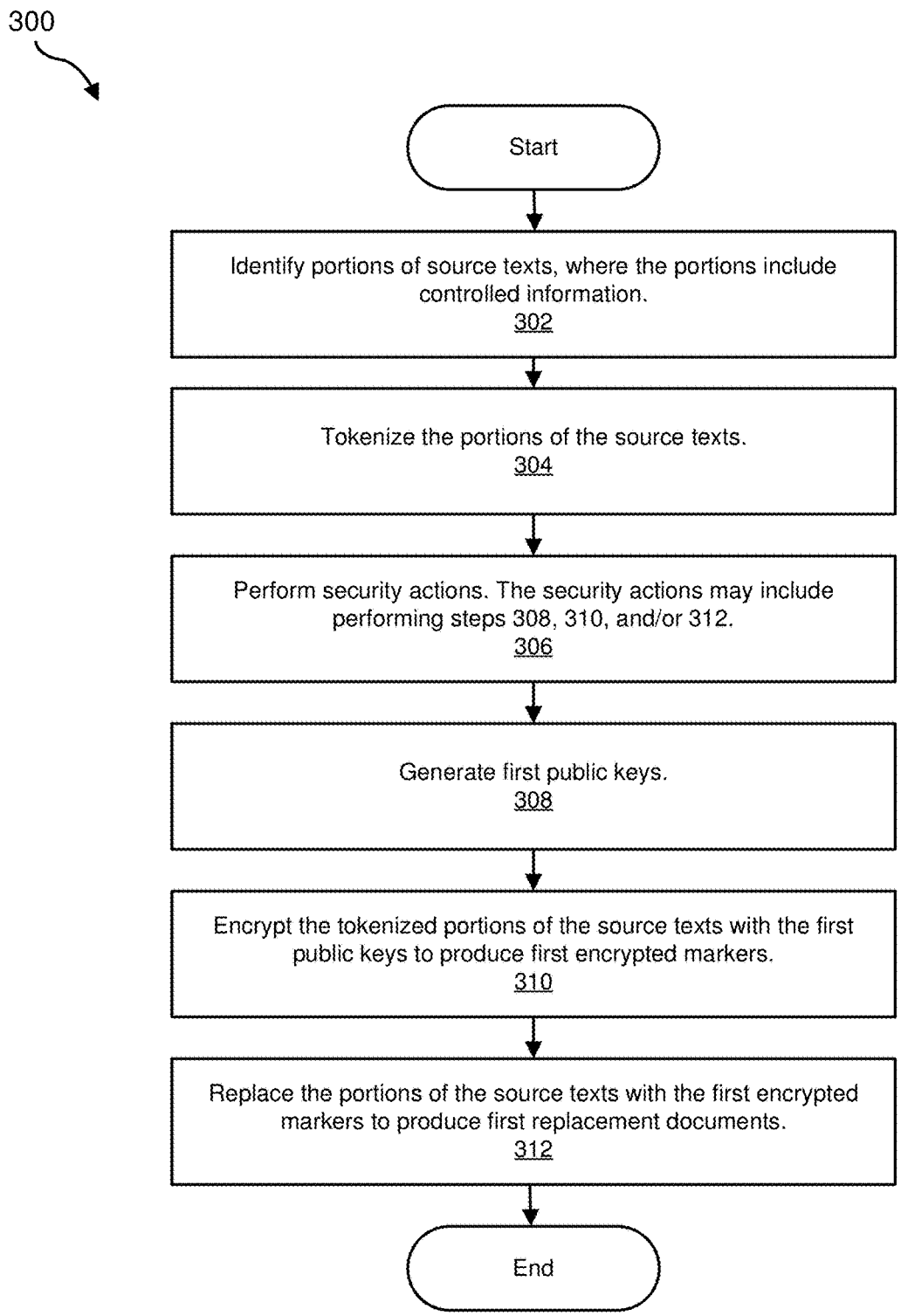
FIG. 3 is a flow diagram of an example method for selectively encrypting controlled information for viewing by an augmented reality device.

FIG. 3 is a flow diagram of an example computer-implemented method 300 for selectively encrypting controlled information for viewing by an augmented reality device. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify portions of source texts. The identifying may include using at least one of natural language processing (NLP) and/or pre-defined data loss prevention policies (DLP) to analyze the source texts. In some examples, the portion may include controlled information. The systems described herein may perform step 302 in a variety of ways. For example, identifying module 104 may, as part of computing device 202 and/or server 206 in FIG. 2, identify, using at least one of natural language processing and pre-defined data loss prevention policy, a portion of source text 124, where the portion includes controlled information 125.

In some examples, the portions of source texts may be paragraphs, sentences, phrases, numerical data, information in a matrix, charts, images, or combinations thereof.

In some examples, the provided techniques may be applied to an entire source text in place of a portion of the source text.

In some embodiments, the portions of source texts may include text from which sensitive information may be inferred. In an example, techniques such as natural language processing (NLP) and/or pre-defined data loss prevention policies (DLP) may identify portions of the source texts that, while not explicitly reciting sensitive information, may include enough information relating to related sensitive information from which users may infer at least some portion of the related sensitive information.

In some examples, performing the NLP techniques may include performing named entity recognition (NER) techniques on the source texts to identify portions of the source texts that, while not explicitly reciting sensitive information, may include enough information relating to related sensitive information from which users may infer at least some portion of the related sensitive information.

In some embodiments, performing the NLP techniques may include resolving co-references (e.g., co-references 121) in the source texts to identify portions of the source texts that, while not explicitly reciting sensitive information, may include enough information relating to related sensitive information from which users may infer at least some portion of the related sensitive information.

The term "controlled information," as used herein, generally refers to limited-access information. In some examples, controlled information may include sensitive information and/or information relating to related sensitive information from which users may infer at least some portion of the related sensitive information.

The term "sensitive information," as used herein, generally refers to valuable information, the uncontrolled dissemination of which may cause harm and/or losses to people, governments, and/or businesses. Examples of sensitive information include, without limitation, personally identifiable information (PII). In some embodiments, sensitive information may include identification (ID) numbers, social security numbers, account numbers in conjunction with names, emails, addresses, phone numbers, financial information, health care information, business strategies, classified government information, law enforcement information, the like, or combinations thereof.

As illustrated in FIG. 3, at step 304 one or more of the systems described herein may tokenize the portions of the source texts. The systems described herein may perform step 304 in a variety of ways. For example, tokenizing module 106 may, as part of computing device 202 and/or server 206 in FIG. 2, tokenize a portion of source text 124.

As illustrated in FIG. 3, at step 306 one or more of the systems described herein may perform security actions. The security actions may include performing at least one of step 308, 310, and/or 312. The systems described herein may perform step 306 in a variety of ways. For example, performing module 108 may, as part of computing device 202 and/or server 206 in FIG. 2, perform, at system 100, security action 126.

In examples, security actions may include prophylactic measures taken to safeguard electronic information. Prophylactic measures may include acts undertaken to prevent, detect, and/or mitigate vulnerabilities of electronic computing devices, to implement computer security policies (e.g., detecting privacy leakage), to detect malicious activities on electronic computing devices, and/or to thwart malicious activities on electronic computing devices.

In some examples, security actions may include prophylactic measures taken to safeguard printed (e.g., on paper) information produced from electronic information. Prophylactic measures may include acts undertaken to prevent, detect, and/or mitigate vulnerabilities of printed information, to implement data loss prevention policies (e.g., preventing and/or mitigating privacy leakage), and/or to thwart malicious activities targeting printed information.

In some examples, method 300 may further include performing security actions in attempts to ameliorate potential security risks. For example, performing modules may identify potential security risks and in response performing modules may perform security actions in attempts to ameliorate the potential security risks. Security actions may include converting human-readable text to at least one encrypted marker.

Security actions may also include notifying users of potential security risks (e.g., via graphical user interfaces depicted on displays). In some examples, security actions may include displaying warnings on user displays. In additional examples, the security actions may include displaying, on user displays, warnings indicating that user approval may be required to upload sensitive information to the Internet.

As illustrated in FIG. 3, at step 308 one or more of the systems described herein may generate first public keys. In an example, one or more of the systems described herein may generate public-private key pairs of which the first public keys are portions. The public-private key pairs may be used to encrypt electronic information such as the portions of the source texts. The systems described herein may perform step 308 in a variety of ways. For example, generating module 110 may, as part of computing device 202 and/or server 206 in FIG. 2, generate public key 127.

In some examples, using the augmented reality devices to read encrypted text (e.g., to read encrypted markers in replacement documents as described herein) requires using private keys associated with respective public keys to decrypt encrypted markers into human-readable text. In an embodiment, the method may further include sending at least one of the first replacement documents and/or the private keys associated with the public keys from the computing devices to the augmented reality devices via secure networks (in a non-limiting example, secure networks meeting FIDO2 standards).

In some embodiments, to enhance security provided by public-private key pairs, private keys may be ephemeral keys. In other words, some private keys may have limited lifetimes. After ephemeral public keys expire, the expired ephemeral keys are no longer usable to decrypt encrypted markers.

In some embodiments, to enhance security provided by public-private key pairs, the private keys may be signed by respective augmented reality devices. Signing the private keys may associate the private keys with specific augmented reality devices so that (i) the signing augmented reality devices may be used with the signed private keys that are signed by the signing augmented reality devices and/or (ii) non-signing augmented reality devices cannot be used with private keys that are not signed by the non-signing augmented reality devices.

In some embodiments, to enhance security provided by public-private key pairs, the private keys may include credentials of at least one user who may be authorized to use the respective private keys.

The term "credential," as used herein, generally refers to authentication information. In some examples, computerized authentication credentials may be used by users to authenticate the respective users. In an example, computerized authentication credentials may be used by augmented reality devices to authenticate users of the augmented reality devices. In some examples, computerized authentication credentials may include, without limitation, digital information describing: passwords, digital tokens, digital certificates, biometric characteristics of people, the like, and combinations thereof.

In some embodiments, to enhance security provided by public-private key pairs, the private keys may store and/or be accompanied by biometric information of at least one user who may be authorized to use the respective private keys. In some examples, augmented reality devices may receive inputs of biometric information (e.g., from users of the augmented reality devices) and may authenticate candidate users by comparing the input biometric information with biometric information stored in and/or with the private keys. Upon authenticating users, the augmented reality devices may use the public keys and the private keys to decrypt encrypted markers in documents associated with the respective public-private key pairs.

In some non-limiting examples, augmented reality devices may request and/or receive private keys from servers. Thus, compromised computing devices (e.g., computing device 202) having access only to encrypted documents would not provide hackers with access to the private keys.

In some non-limiting embodiments, augmented reality devices may request and/or receive public keys from computing devices (e.g., system 100, computing device 202, server 206).

As illustrated in FIG. 3, at step 310 one or more of the systems described herein may encrypt the tokenized portions of the source texts with the first public keys to produce first encrypted markers. The systems described herein may perform step 310 in a variety of ways. For example, encrypting module 112 may, as part of computing device 202 and/or server 206 in FIG. 2, encrypt tokenized portion of source text 128 with public key 127 to produce encrypted marker 129.

In some examples, the method may further include embedding the first public keys in the first encrypted markers. Embedding the public keys in the encrypted markers may make accessing the public keys convenient during decryption processes.

In some embodiments, the encrypted markers may be ephemeral markers. In other words, some encrypted markers may have limited lifetimes. After ephemeral encrypted markers expire, the expired encrypted markers are no longer usable. In some examples, when ephemeral encrypted markers expire, an expiration notice may be displayed on user display devices in place of the expired encrypted markers.

In an embodiment, the encrypted markers may be machine-readable representations of electronic information. In an embodiment, the encrypted markers may be barcodes. In some examples, the encrypted markers may be two-dimensional barcodes. In some examples, the first encrypted markers may be quick response (QR) codes, DataMatrix codes, Maxicode codes, and/or PDF417 codes. In some embodiments, the encrypted markers may be three-dimensional barcodes. In some examples, the first encrypted markers may be color quick response (CQR) codes, High Capacity Color Barcodes (HCBB), and/or paper memory (PM) codes.

As illustrated in FIG. 3, at step 312 one or more of the systems described herein may replace the portion of the source texts with the first encrypted markers to produce first replacement documents. The systems described herein may perform step 312 in a variety of ways. For example, replacing module 114 may, as part of computing device 202 and/or server 206 in FIG. 2, replace the portion of source text 124 with encrypted marker 129 to produce replacement document 130.

In some non-limiting embodiments, augmented reality devices may request and/or receive replacement documents from computing devices (e.g., system 100, computing device 202, server 206).

In some embodiments, one or more of the systems described herein may send the first replacement documents and/or private keys via network devices to the augmented reality devices. For example, sending module 116 may, as part of computing device 202 and/or server 206 in FIG. 2, send replacement document 130 via network adapter 160 to augmented reality device 208. In an example, sending module 116 may, as part of server 206 in FIG. 2, send replacement document 130 via network adapter 160 to computing device 202.

In some examples, method 300 may include (i) receiving user-selections of portions of source texts, where the portions include controlled information, (ii) generate public keys, (iii) encrypt the portions of the source texts with the public keys to produce the encrypted markers, (iv) embed the public keys in the encrypted markers, and/or (v) sending the encrypted markers via network devices to augmented reality devices.

In some embodiments, subsequent encrypted markers may be prepared for the same controlled information in the source texts in response to the first markers being decrypted and associated text displayed, such as in implementations using encrypted markers that have a limited number of decryptions (e.g., one decryption, two decryptions, etc.). In some examples, the method may further include (i) receiving, at the computing devices, indications of displaying the portions of the source texts on the user displays of the augmented reality devices, (ii) generating second public keys, (iii) encrypting the portions of the source texts with the second public keys to produce second encrypted markers, (iv) replacing the portions of the source texts with the second encrypted markers to produce second replacement documents, and/or (v) sending the second replacement documents to the augmented reality devices. In an embodiment, the method may further include embedding the second public keys in the second encrypted markers.

In some embodiments, controlled source texts may be declassified (i.e., as no longer including controlled information, thus converting the controlled source texts into previously-controlled source text. Thus, in some examples, the method may further include (i) receiving, at the computing devices, indications the controlled information identified by the first encrypted markers is no longer controlled information and (ii) sending the previously-controlled information to the augmented reality devices with the portions of the source texts in place of the first markers.

In an embodiment, augmented reality devices may receive replacement documents via network adapters. In some examples, the augmented reality devices may (i) receive images of encrypted markers (e.g., when a user views an encrypted marker with an augmented reality device), (ii) calculate, from the encrypted markers, placeholder display areas, (iii) display documents including placeholder images in the placeholder display areas on user displays of the augmented reality devices, and/or (iv) perform a security action including (A) decrypting the encrypted markers with private keys to produce decrypted text including sensitive information and/or (B) display the decrypted text on the user displays of the augmented reality devices in place of the placeholder images. In an embodiment, augmented reality devices may (i) receive images of unencrypted text substantially adjacent to images of the encrypted markers and/or (ii) display the unencrypted text substantially adjacent to the decrypted text on the user displays of the augmented reality devices.

As detailed herein, the steps outlined in method 300 in FIG. 3 may advantageously enable computing devices to improve a state of cybersecurity of target computing devices, potentially resulting in significant time and/or monetary savings. Examples of the provided techniques described herein may improve functioning of a computing device and/or provide targeted protection against data loss, and thus improve fields of data loss protection in general, by providing methods for selectively encrypting controlled information for viewing by an augmented reality device.

In some examples, provided are systems and methods for determining which portions of source text are encrypted using encrypted markers. In some examples, the provided techniques may protect users by beneficially defending against contextual attacks by encrypting portions of source text from which sensitive information may be inferred from related context. In some embodiments, provided are systems and methods that may authenticate, authorize use, and/or enable visualization access using encrypted markers as substitutes for parts of documents including sensitive information. Thus, in some embodiments, the provided techniques may advantageously protect sensitive information from data loss.

FIG. 4 depicts a non-limiting example 400 of implementing method 300 on input paragraph 402. Input paragraph 402 may be a non-limiting example of source text. Implementing examples of method 300 on input paragraph 402 may yield first output paragraph 404, in which controlled information in a form of keywords such as "ALPHA", "departments X, Y and Z", and "Dublin" are replaced with respective encrypted markers. For ease of readability, FIG. 4 depicts replaced text in brackets with the term "MARKER" after the text replaced by encrypted markers. A replacement document including first output paragraph 404 and sent to an augmented reality device includes encrypted markers in place of the replaced text in brackets.

Implementing examples of method 300 on input paragraph 402 and/or first output paragraph 404 may yield second output paragraph 406. Analyzing input paragraph 402 and/or first output paragraph 404 using natural language processing techniques identifies that the second sentence of input paragraph 402 is related to project ALPHA so the second sentence of input paragraph 402 is merged into the text encrypted into the ALPHA marker. Resolving co-references in input paragraph 402 and/or first output paragraph 404 detects a coreference in the last sentence of input paragraph 402, where a reference to "first project" is found to be related with project ALPHA. In this instance, a new encrypted marker may be created. The provided techniques may beneficially reduce numbers of markers generated while protecting each topic of the document from unauthorized inferences.

Figure 5:
FIG. 5 depicts a non-limiting example of replacement text including an encrypted marker.

FIG. 5 depicts a non-limiting example of replacement text 500 including an encrypted marker 502. In this non-limiting example, second output paragraph 406 is depicted including encrypted marker 502. In this non-limiting example, encrypted marker 502 stores an encrypted version of the text "The project ALPHA will affect the departments X, Y and Z in Dublin. The project will be undertaken during three distinct phases, the first one starting this quarter."

Figure 6:
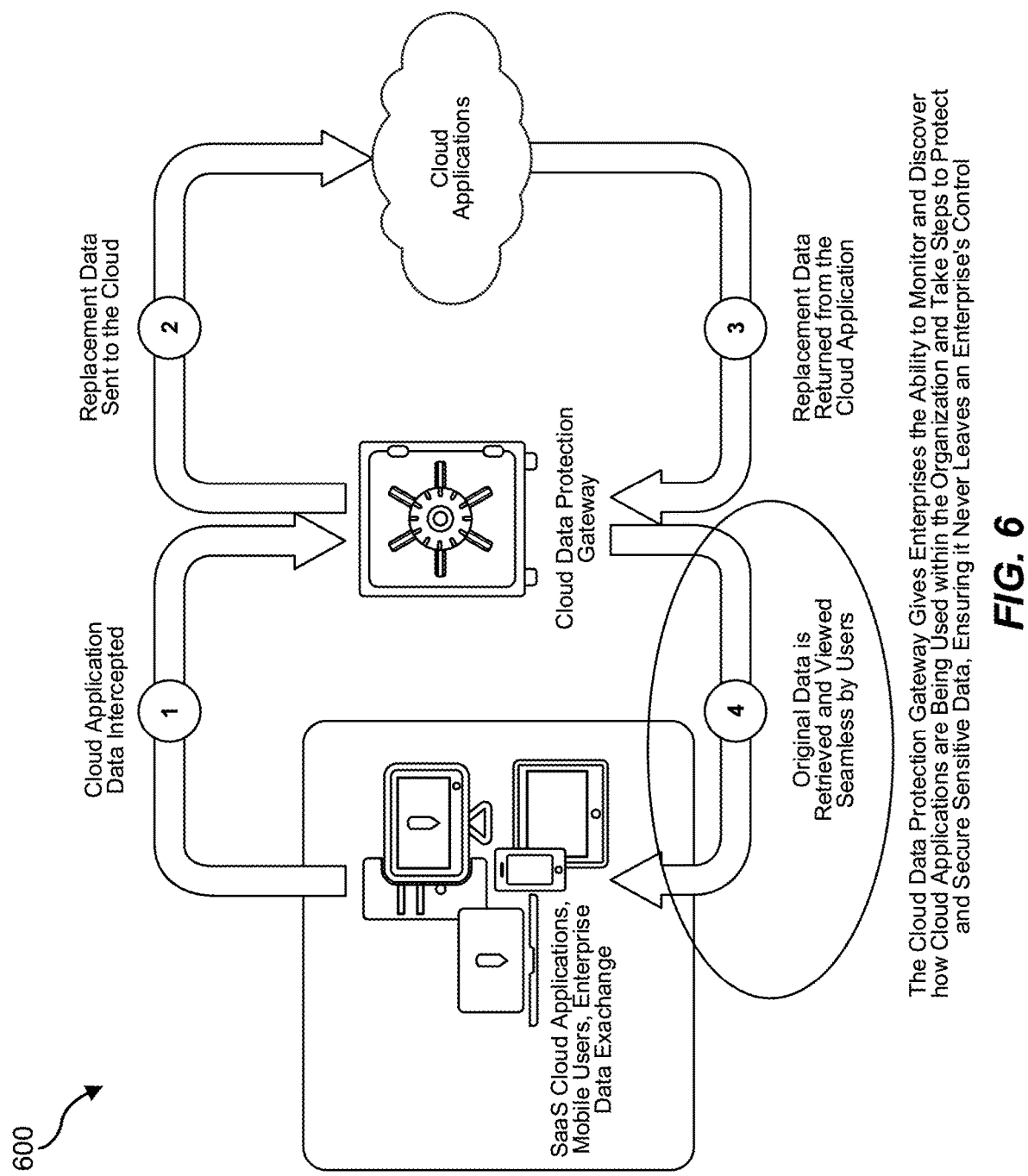
FIG. 6 depicts a non-limiting example of a method for storing replacement text including an encrypted marker being stored in a cloud storage device.

FIG. 6 depicts a non-limiting example of a method 600 for storing replacement text including an encrypted marker being stored in a cloud storage device. In a first step, cloud application data is intercepted by a cloud data protection gateway. The cloud data protection gateway performs at least a part of a method described herein for selectively encrypting controlled information to produce replacement documents (e.g., replacement data). In a second step, the replacement document is sent to cloud applications such as a cloud storage device. In a third step, the cloud applications send the replacement documents to the cloud data protection gateway. The cloud data protection gateway then decrypts the replacement documents and sends a decrypted version of the replacement documents to users. In this case, the cloud data protection gateway maintains the public and private keys for performing the encryption and decryption processes.

Figure 7:
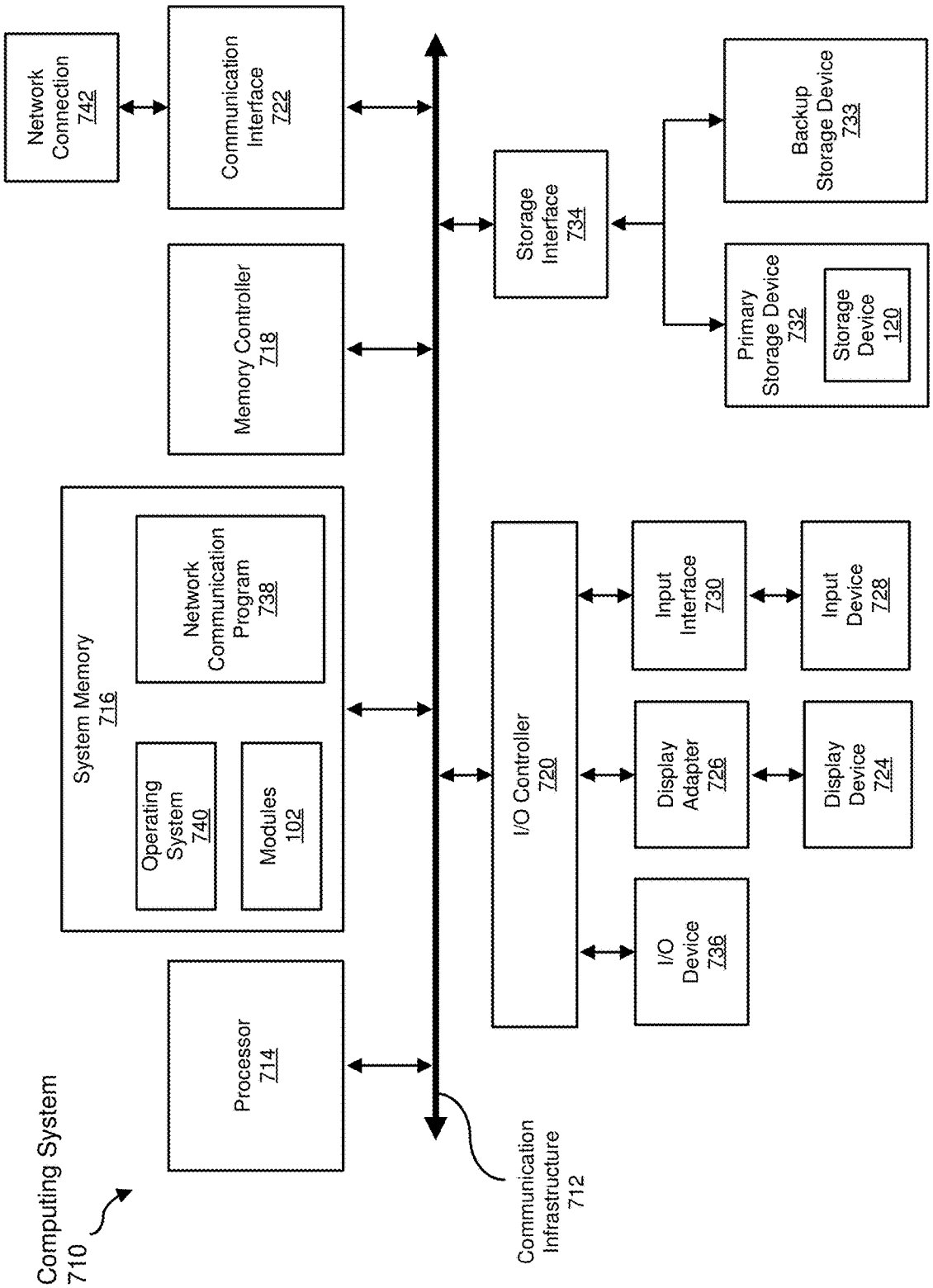
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, storage device 120 from FIG. 1 may be a constituent part of primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
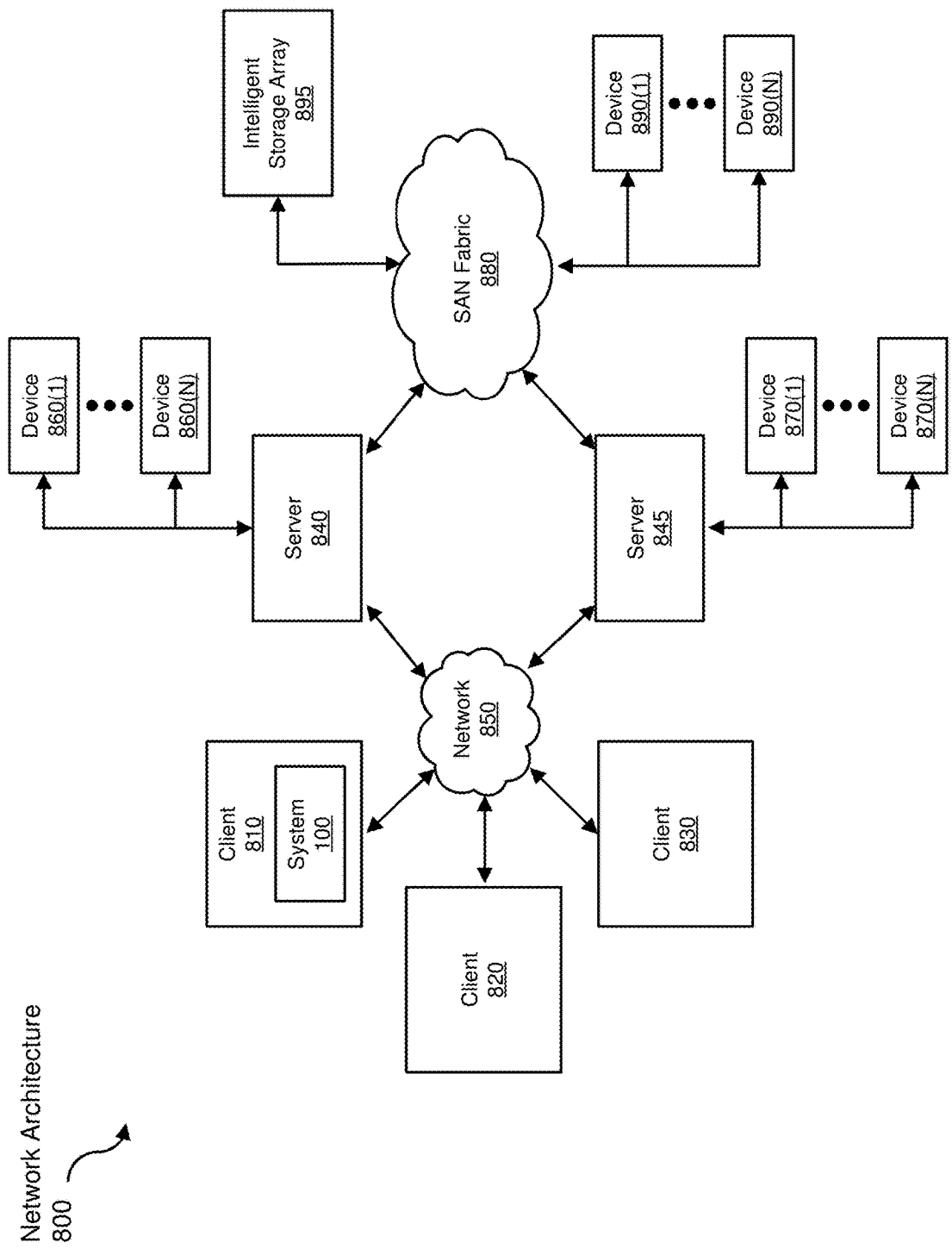
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the present disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for selectively encrypting controlled information for viewing by an augmented reality device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive source text to be transformed, transform the source text to replacement text, output a result of the transformation to a network interface device, use the result of the transformation to prevent data loss, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. The singular may portend the plural where practicable. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for selectively encrypting controlled information for viewing by an augmented reality device, at least a portion of the method being performed by a computing device comprising at least one processor, the method comprising:
    automatically identifying, at the computing device and using at least one of natural language processing and a pre-defined data loss prevention policy, controlled information presented in a portion of source text;
    tokenizing the portion of the source text; and
    performing, at the computing device, a security action comprising:
        generating a first public key;
        encrypting the tokenized portion of the source text with the first public key;
        producing a first encrypted marker that includes the encrypted tokenized portion of the source text and embeds the first public key;
        creating a first replacement document that includes the source text with the first encrypted marker presented in the source text in place of the portion of the source text; and
        providing the first replacement document to the augmented reality device for viewing by the augmented reality device.

2. The method of claim 1, wherein the portion of the source text is a paragraph.

3. The method of claim 1, wherein the at least one of natural language processing and a pre-defined data loss prevention policy are used to infer, from a context in which information is presented in the source text, that controlled information is being presented in the portion of source text.

4. The method of claim 1, wherein the first encrypted marker is an ephemeral marker.

5. The method of claim 1, wherein the first encrypted marker is a two-dimensional barcode.

6. The method of claim 1, wherein providing the first replacement document to the augmented reality device for viewing by the augmented reality device comprises sending at least one of the first replacement document and a private key from the computing device to the augmented reality device via a secure network.

7. The method of claim 6, wherein the private key is an ephemeral key.

8. The method of claim 6, wherein the private key is signed by the augmented reality device.

9. The method of claim 6, wherein the private key includes biometric information.

10. The method of claim 1, further comprising:
receiving, at the computing device, an indication of displaying the portion of the source text on a user display of the augmented reality device;
generating a second public key;
encrypting the tokenized portion of the source text with the second public key;
producing a second encrypted marker that includes the encrypted tokenized portion of the source text and embeds the second public key;
creating a second replacement document that includes the source text with the second encrypted marker presented in the source text in place of the portion of the source text; and
providing the second replacement document to the augmented reality device for viewing by the augmented reality device.

11. The method of claim 1, further comprising:
receiving, at the computing device, an indication that the identified controlled information is no longer controlled information; and
sending the identified controlled information to the augmented reality device with the portion of the source text in place of the first encrypted marker.

12. A system for selectively encrypting controlled information for viewing by an augmented reality device, the system comprising:
at least one physical processor; and
physical memory comprising computer-executable instructions that, when executed by the physical processor, cause the physical processor to:
automatically identify, at the system and using at least one of natural language processing and a pre-defined data loss prevention policy, controlled information presented in a portion of source text;
tokenize the portion of the source text; and
perform, at the system, a security action comprising:
generating a public key;
encrypting the tokenized portion of the source text with the public key;
producing a first encrypted marker that includes the encrypted tokenized portion of the source text and embeds the public key;
creating a first replacement document that includes the source text with the first encrypted marker presented in the source text in place of the portion of the source text; and
providing the first replacement document to the augmented reality device for viewing by the augmented reality device.

13. The system of claim 12, wherein the at least one of natural language processing and a pre-defined data loss prevention policy are used to infer, from a context in which information is presented in the source text, that controlled information is being presented in the portion of source text includes text.

14. The system of claim 12, wherein the first encrypted marker is an ephemeral marker.

15. The system of claim 12, wherein the portion of the source text is a paragraph.

16. The system of claim 12, wherein providing the first replacement document to the augmented reality device for viewing by the augmented reality device comprises sending at least one of the first replacement document and a private key from the system to the augmented reality device via a secure network.

17. A non-transitory computer-readable medium comprising one or more computer-executable instructions that, when executed by at least one processor of a computing device, cause the computing device to:
automatically identify, at the computing device and using at least one of natural language processing and a pre-defined data loss prevention policy, controlled information presented in a portion of source text;
tokenize the portion of the source text; and
perform, at the computing device, a security action comprising:
generating a public key;
encrypting the tokenized portion of the source text with the public key;
producing a first encrypted marker that includes the encrypted tokenized portion of the source text and embeds the public key;
creating a first replacement document that includes the source text with the first encrypted marker presented in the source text in place of the portion of the source text; and
providing the first replacement document to an augmented reality device for viewing by the augmented reality device.

18. The non-transitory computer-readable medium of claim 17, wherein the at least one of natural language processing and a pre-defined data loss prevention policy are used to infer, from a context in which information is presented in the source text, that controlled information is being presented in the portion of source text.

19. The non-transitory computer-readable medium of claim 17, wherein the first encrypted marker is an ephemeral marker.

20. The non-transitory computer-readable medium of claim 17, wherein the portion of the source text is a paragraph.

* * * * *

UNITED STATES PATENT AND TRADEMARK OFFICE
CERTIFICATE OF CORRECTION

PATENT NO. : 11,216,565 B1  
APPLICATION NO. : 16/449582  
DATED : January 4, 2022  
INVENTOR(S) : David Silva et al.

Page 1 of 1

It is certified that error appears in the above-identified patent and that said Letters Patent is hereby corrected as shown below:

In the Claims

In Column 22, Lines 2-3, in Claim 13, delete "text includes text." and insert -- text. --.

Signed and Sealed this
Second Day of August, 2022

Katherine Kelly Vidal
*Director of the United States Patent and Trademark Office*